United States Patent
Marchetti et al.

(10) Patent No.: US 9,446,540 B2
(45) Date of Patent: Sep. 20, 2016

(54) HYBRID COMPOSITE UTILIZING INJECTION-EXPANSION MOLDING

(71) Applicant: Ford Global Technologies, LLC, Dearborn, MI (US)

(72) Inventors: Bernard Gerard Marchetti, Rochester Hills, MI (US); Kalyanaraman Bharathan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/711,210

(22) Filed: May 13, 2015

(65) Prior Publication Data

US 2015/0321397 A1   Nov. 12, 2015

Related U.S. Application Data

(63) Continuation-in-part of application No. 14/270,951, filed on May 6, 2014, now Pat. No. 9,186,993.

(51) Int. Cl.
*B60K 37/00* (2006.01)
*B29C 44/04* (2006.01)
*B62D 25/14* (2006.01)
*B62D 29/04* (2006.01)
(Continued)

(52) U.S. Cl.
CPC .......... *B29C 44/0461* (2013.01); *B29C 44/027* (2013.01); *B60K 37/00* (2013.01); *B62D 25/14* (2013.01); *B62D 29/04* (2013.01); *C08J 9/00* (2013.01); *C08J 9/0061* (2013.01); *C08J 9/0085* (2013.01); *B29K 2077/00* (2013.01); *B29K 2105/12* (2013.01); *B29K 2307/04* (2013.01); *B29K 2309/08* (2013.01); *B29L 2031/3008* (2013.01); *C08J 2377/06* (2013.01); *Y10T 428/249981* (2015.04)

(58) Field of Classification Search
CPC .. B62D 25/14; B62D 27/026; B62D 29/043; B29C 45/0005; B29C 45/16; B29C 45/1704; B29C 2045/0006; B29C 2045/0008; B29L 2031/3008; B29K 2105/12
USPC .............................................. 180/90; 296/70
See application file for complete search history.

(56) References Cited

U.S. PATENT DOCUMENTS 4,884,778 A   12/1989   Yamamoto
5,088,571 A    2/1992   Burry et al.
(Continued)

FOREIGN PATENT DOCUMENTS

DE         3806783 A1    9/1989
DE    102008021103 A1   10/2009
(Continued)

*Primary Examiner* — James English
(74) *Attorney, Agent, or Firm* — Vichit Chea; Price Heneveld LLP (57) ABSTRACT

A vehicular instrument panel including a substrate having a first plurality of chopped carbon fibers within a first nylon resin and an expanded reinforcement coupled to the substrate having a second plurality of chopped carbon fibers within a second nylon resin. The first plurality of chopped carbon fibers and the first plurality of glass fibers in the substrate are segregated such that the carbon fibers and the glass fibers are each substantially concentrated within respective driver-side and passenger-side portions of the substrate. An expanded, structural duct has a second plurality of chopped glass fibers within a third nylon resin. The duct, reinforcement and substrate are coupled to form a hollow tube.

20 Claims, 7 Drawing Sheets

(51) Int. Cl.
  *C08J 9/00* (2006.01)
  *B29C 44/02* (2006.01)
  *B29K 77/00* (2006.01)
  *B29K 307/04* (2006.01)
  *B29K 309/08* (2006.01)
  *B29L 31/30* (2006.01)
  *B29K 105/12* (2006.01)

(56) References Cited

U.S. PATENT DOCUMENTS

| | | | |
|---|---|---|---|
| 5,162,092 A | 11/1992 | Klobucar et al. |
| 5,364,159 A | 11/1994 | Kelman et al. |
| 5,979,860 A | 11/1999 | Jurik et al. |
| 5,997,781 A | 12/1999 | Nishikawa et al. |
| 6,063,315 A | 5/2000 | Keller et al. |
| 6,260,875 B1 | 7/2001 | Stawicki et al. |
| 6,497,432 B2 | 12/2002 | Scheib et al. |
| 6,517,145 B2 | 2/2003 | Hedderly |
| 6,692,026 B2 | 2/2004 | Gianaris et al. |
| 6,773,640 B2 | 8/2004 | Sugihara et al. |
| 6,802,559 B2 | 10/2004 | Yoshihara et al. |
| 6,875,484 B1 | 4/2005 | Kogure et al. |
| 6,952,979 B2 | 10/2005 | Cartwright et al. |
| 7,303,714 B2 | 12/2007 | Matsuzaki et al. |
| 7,364,788 B2 | 4/2008 | Kishbaugh et al. |
| 7,528,206 B2 | 5/2009 | Kitano et al. |
| 7,632,445 B2 | 12/2009 | Porter et al. |
| 8,221,673 B2 | 7/2012 | Saur et al. |
| 8,449,013 B2 | 5/2013 | Carter |
| 2006/0051569 A1 | 3/2006 | Porter et al. |
| 2006/0097539 A1 | 5/2006 | Noisternig et al. |
| 2008/0098655 A1 | 5/2008 | Valentage |
| 2008/0315612 A1 | 12/2008 | D'Alessandro |
| 2011/0233955 A1 | 9/2011 | Utsugi et al. |
| 2012/0280529 A1* | 11/2012 | Sapak | B60R 13/025 296/1.08 |
| 2013/0052412 A1 | 2/2013 | Fox et al. |
| 2013/0249242 A1 | 9/2013 | Kimoto et al. |

FOREIGN PATENT DOCUMENTS

| | | |
|---|---|---|
| EP | 0083701 A2 | 7/1983 |
| EP | 0925895 A1 | 12/1998 |
| WO | 0170558 A1 | 9/2001 |
| WO | 2013072021 A1 | 5/2013 |

* cited by examiner

HYBRID COMPOSITE UTILIZING INJECTION-EXPANSION MOLDING

CROSS-REFERENCE TO RELATED APPLICATION

The present application is a continuation-in-part application that claims priority to and the benefit under 35 U.S.C. §120 of U.S. patent application Ser. No. 14/270,951 filed on May 6, 2014, now issued as U.S. Pat. No. 9,186,993, entitled "HYBRID COMPOSITE INSTRUMENT PANEL," the entire disclosure of which is hereby incorporated herein by reference.

FIELD OF THE INVENTION

The present disclosure generally relates to composite component designs, and more particularly relates to composite vehicular instrument panel designs and methods for making the same.

BACKGROUND OF THE INVENTION

It is becoming more common for vehicles to utilize lightweight components and designs in order to decrease vehicle weight, particularly in large, interior vehicle components such as instrument panels. Weight reductions can increase vehicle performance and fuel economy. Weight savings may be realized by substituting current materials of vehicle components with lighter weight materials. However, in some cases, lighter weight materials employed in vehicles can have less mechanical integrity than their heavier weight counterparts.

In other cases, certain lighter weight materials, such as carbon fiber composites, can actually have improved mechanical performance over conventional materials. Unfortunately, the manufacturing costs of making vehicular components with these materials can be prohibitive or at least not low enough to offset the potential improvements in vehicle performance and fuel economy. Further, these stronger composite materials are often employed in large vehicular components that have only one, or a handful, of regions that actually require elevated mechanical performance.

Accordingly, there is a need for lighter-weight vehicular components having better or comparable mechanical performance when compared to conventional vehicular components. There is also a need to tailor the mechanical properties in particular regions within these components for the particular application, thus minimizing the use of expensive reinforcing materials and maximizing mechanical property enhancements where it is required in the component.

SUMMARY OF THE INVENTION

According to one aspect of this disclosure, vehicular instrument panel includes a substrate including a first plurality of chopped carbon fibers within a first nylon resin and an expanded reinforcement coupled to the substrate having a second plurality of chopped carbon fibers within a second nylon resin. The first plurality of chopped carbon fibers and the first plurality of glass fibers in the substrate are segregated such that the carbon fibers and the glass fibers are each substantially concentrated within respective driver-side and passenger-side portions of the substrate. An expanded, structural duct has a second plurality of chopped glass fibers within a third nylon resin. The duct, reinforcement and substrate are coupled to form a hollow tube.

According to another aspect of this disclosure, a vehicular instrument panel having a first expanded member includes a first fiber composite material. A second expanded member includes a second fiber composite material. A substrate coupled to the expanded members includes a first fiber material and a second fiber material within a resin. The first and second fiber materials are segregated into respective driver-side and passenger-side portions of the substrate. The first and second expanded members are coupled to support the substrate.

According to another aspect of this disclosure, a method of forming a vehicular component includes steps of melting a first composite having a first fiber material, a first resin, and a first expansion agent and melting a second composite having a second fiber material, a second resin, and a second expansion agent. The melted first and second composites are then injected into a mold, such that the first and second composites are each substantially concentrated into respective first and second portions of the mold. The mold is then opened, allowing the melted composites to expand. The cooled and expanded composites form an instrument panel component.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
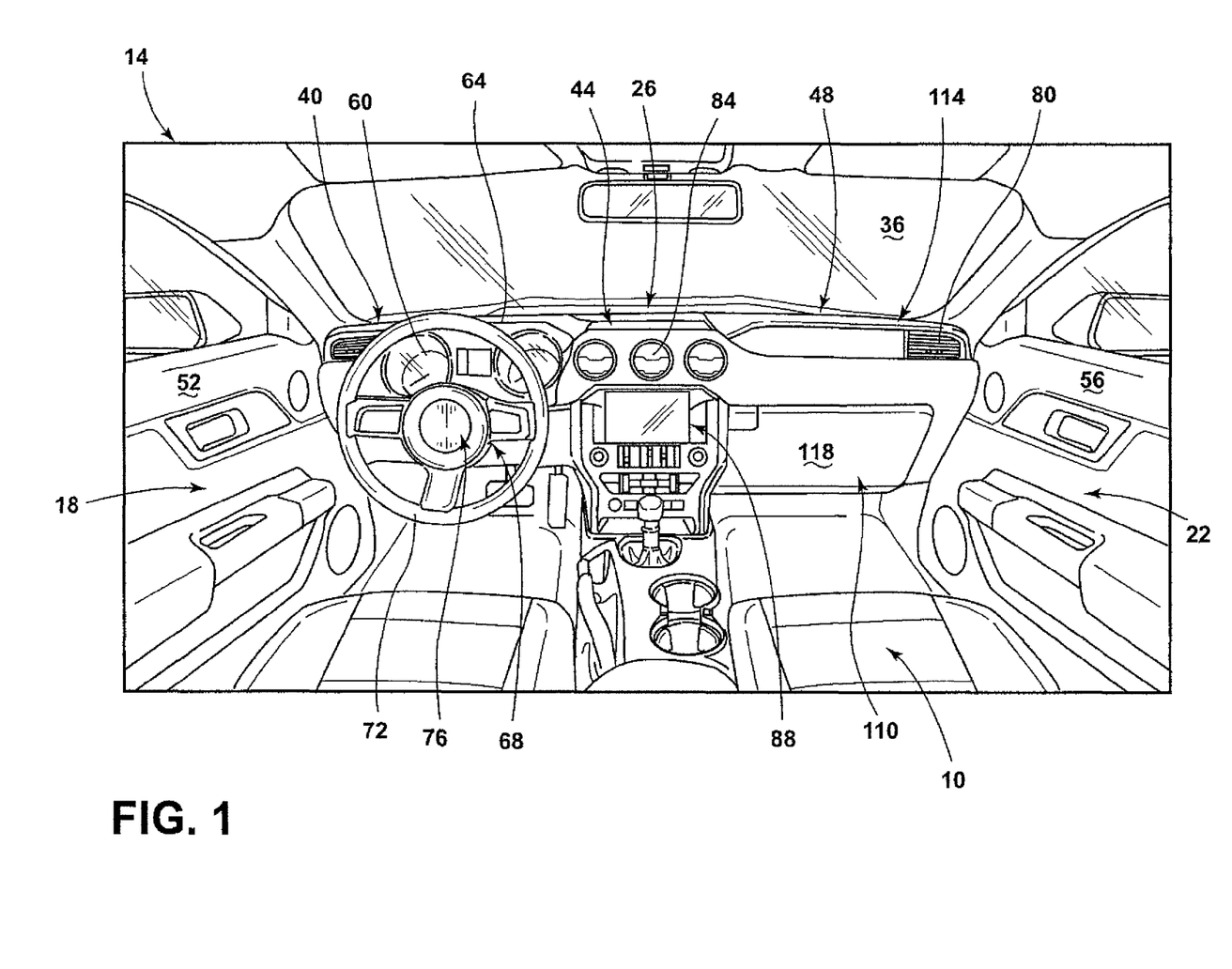
FIG. 1 is a front perspective view of a vehicular instrument panel within a vehicle according to one embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a cabin 10 of a vehicle 14 is depicted. The vehicle 14 includes a driver-side region 18 and a passenger-side region 22. Inside the cabin 10 is an instrument panel 26, among other vehicle components, such as a windshield 36. The instrument panel 26 is located vehicle forward of the passenger seating in the cabin 10 and generally beneath the windshield 36. The instrument panel 26 has a driver-side portion 40, a center-stack portion 44, and a passenger-side portion 48. These portions of the instrument panel 26, and particular regions or locations within them, often have differing mechanical property requirements.

As used in this disclosure, "outboard" refers to the lateral sides or regions most proximate to a driver-side door 52 and a passenger-side door 56 in the vehicle 14. The term "inboard," as used in this disclosure, refers to a central area in the vehicle 14 inboard from the laterally opposing outboard sides or regions.

The driver-side and passenger-side portions 40, 48 of the instrument panel 26 are in substantial proximity to respective driver-side and passenger-side regions 18, 22 of the vehicle 14. The driver-side portion 40 of the instrument panel 26 includes an instrument cluster 60 covered by an instrument cluster hood 64. Located below the instrument cluster 60 is a steering column 68. The steering column 68 is supported by the instrument panel 26 and engages a steering system (not shown) vehicle forward of the instrument panel 26. The steering column 68 extends from the steering system into the cabin 10 through the instrument panel 26. The steering column 68 has a steering wheel 72 disposed in the cabin 10 in the driver-side region 18 of the vehicle 14. The steering wheel 72 includes a driver airbag 76 which is deployable upon experiencing a sufficient vehicle collision event. As such, the driver-side portion 40 of the instrument panel 26 can have demanding mechanical requirements, particularly at locations where it must support other vehicular components subject to variable loads and motion, e.g., steering column 68.

Disposed on each outboard side of the instrument panel 26 is a side air vent 80. The instrument panel 26 also incorporates a set of central air vents 84 located in the center-stack portion 44 of the instrument panel 26. The center-stack portion 44 of the instrument panel 26 is located between the driver-side portion 40 and the passenger-side portion 48. The center-stack portion 44 includes an interface 88 that is operable by occupants of both the driver-side and the passenger-side regions 18, 22 of the vehicle 14. The center-stack portion 44 is connected to both the driver-side portion 40 and the passenger-side portion 48 of the instrument panel 26.

As also depicted in FIG. 1, the passenger-side portion 48 of the instrument panel 26 includes a glove box assembly 110, and a passenger airbag assembly 114 that is located above the assembly 110. The glove box assembly 110 includes a glove box door 118 permitting access to a glove box bin (not shown). In some embodiments, the glove box assembly 110 is a separate component from the instrument panel 26 and is inserted and attached during vehicle manufacturing. In other embodiments, the glove box bin of the assembly 110 is integrally formed from an instrument panel substrate 120 (FIG. 2) of the instrument panel 26 and the glove box door 118 is a separate component that is attached during manufacturing. Depending on the configuration of passenger-side portion 48, it may have central regions or locations that require additional mechanical reinforcement, such as where it contains or attaches to glove box assembly 110.

The passenger airbag assembly 114 includes a passenger airbag chute 124 (FIG. 2), and other components such as a passenger airbag, an airbag canister, and an inflator. During a vehicle collision event, the passenger airbag is inflated by the inflator (not shown), thereby causing the passenger airbag to expand from the canister through the passenger airbag chute 124 (FIG. 2) and out of the instrument panel 26. The inflation and expansion of the airbag generates high stresses in surrounding components which can lead to structural failure of the instrument panel 26 if not properly reinforced. In some embodiments, the instrument panel substrate 120 (FIG. 2) of the instrument panel 26 may also include knee airbag canisters for the occupants of both the driver-side and passenger-side regions 18, 22, potentially necessitating additional reinforcement.

Figure 2:
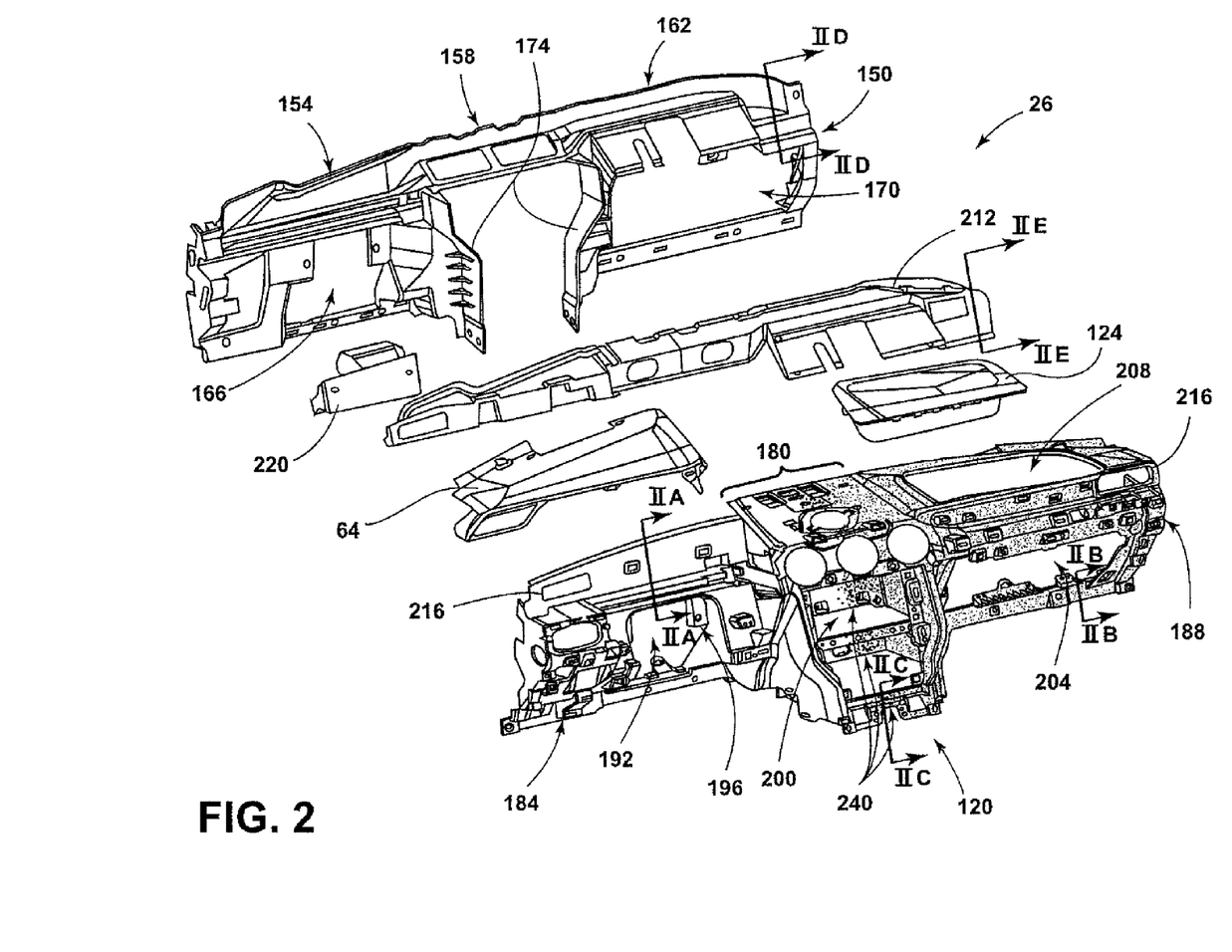
FIG. 2 is an exploded top perspective view of the instrument panel depicted in FIG. 1.
Figure 2A:
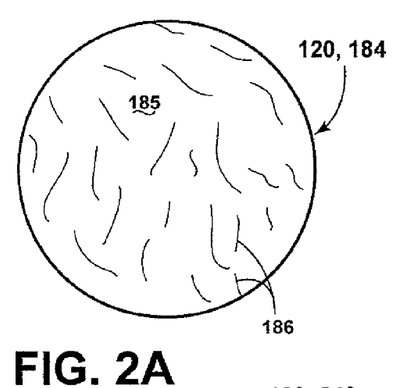
FIG. 2A is an enhanced cross sectional view of the instrument panel of FIG. 2, taken at II A-II A.
Figure 2B:
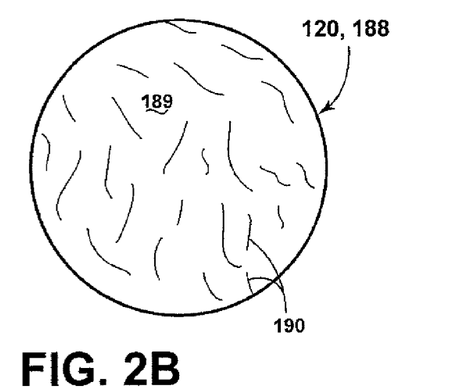
FIG. 2B is an enhanced cross-sectional view of the instrument panel of FIG. 2, taken at II B-II B.
Figure 2C:
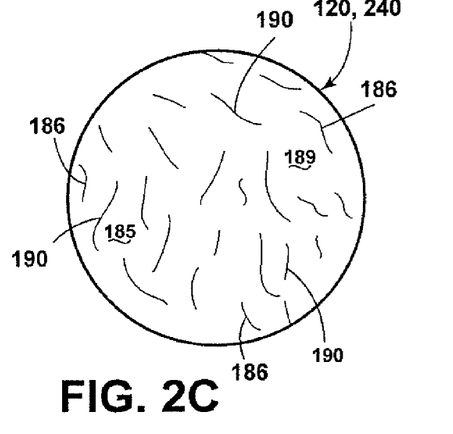
FIG. 2C is an enhanced cross sectional view of the instrument panel of FIG. 2 taken at II C-II C.
Figure 2D:
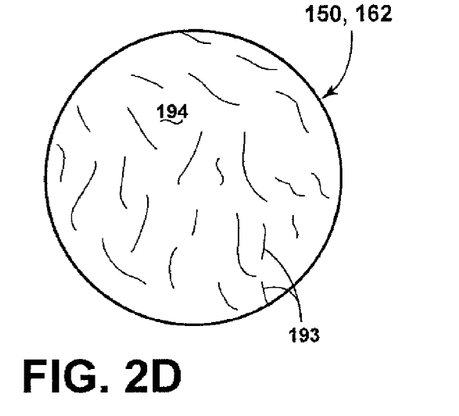
FIG. 2D is an enhanced cross-sectional view of the instrument panel of FIG. 2 taken at II D-II D.
Figure 2E:
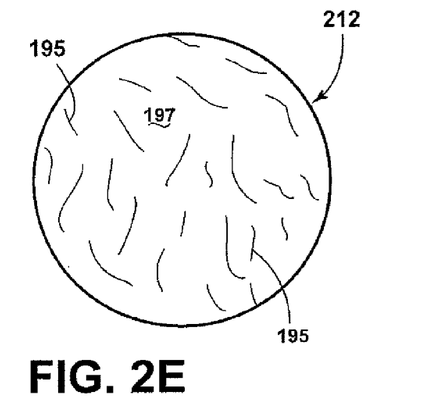
FIG. 2E is an enhanced cross-sectional view of the instrument panel of FIG. 2 taken at II E-II E.

Referring now to FIG. 2, the instrument panel 26 includes the instrument panel substrate 120 and a reinforcement 150. The reinforcement 150 is located vehicle forward of the substrate 120 and is coupled to the substrate 120 at multiple points. The substrate 120 and the reinforcement 150 may be coupled via adhesive bonding, vibration welding, hot plate welding, or other forms of joining. The reinforcement 150 includes a driver-side portion 154, a center-stack portion 158, and a passenger-side portion 162. The reinforcement 150 defines a steering column aperture 166 and a glove box aperture 170 on the respective driver-side and passenger-side portions 154, 162. Flanges 174 are located within the center-stack portion 158 of the reinforcement 150 and extend vehicle rearward to engage and couple with a center-stack portion 180 of the substrate 120.

As also depicted in FIG. 2, the instrument panel substrate 120 includes a driver-side portion 184, the center-stack portion 180, and a passenger-side portion 188. The driver-side portion 184 of the substrate 120 defines a steering column opening 192 which aligns with the steering column aperture 166 of the reinforcement 150 when the substrate 120 and the reinforcement 150 are coupled. The steering column 68 (FIG. 1) passes through both the steering column aperture 166 and the steering column opening 192, and is attached to the substrate 120 via a steering column mounting area 196, as shown in FIG. 2. The steering column mounting area 196 is located on the substrate 120 proximate to the steering column opening 192. In some embodiments, a jacket for the steering column 68 may be integrally formed in the substrate 120 proximate to the mounting area 196. In other embodiments, a mounting bracket or a support bracket may be integrally formed in the substrate 120 proximate to the steering column opening 192 for supporting the steering column 68. The coupling of the reinforcement 150 to the substrate 120 provides sufficient strength for the mounting area 196, and ultimately the instrument panel 26, to support the weight of the steering column 68 without the use of a cross-car beam. As such, certain regions or locations in the driver-side portion 184 of the substrate 120 may require and/or benefit from additional reinforcement.

The center-stack portion 180 of the instrument panel substrate 120 includes an electronics bay 200 for housing and mounting the interface 88 (FIG. 1) as well as other electronic components. The center-stack portion 180 is located between and is integrally connected to both the driver-side and passenger-side portions 184, 188 of the substrate 120. Depending on the electronic components and other components deployed in the center-stack portion 180, additional localized reinforcement in the substrate 120 with hybrid composites in these regions could provide mechanical performance and/or weight savings benefits.

The passenger-side portion 188 of the instrument panel substrate 120 defines a glove box opening 204 and a passenger airbag assembly opening 208 for housing the respective glove box assembly 110 (FIG. 1) and passenger airbag assembly 114 (FIG. 1). In some embodiments, the substrate 120 may be configured to further define a glove box bin and/or an airbag canister as integral bodies that extend from the respective glove box and passenger airbag assembly openings 204, 208. In other embodiments, the reinforcement 150 could be configured to define a glove box bin and/or an airbag canister. The substrate 120 and the reinforcement 150 can also be configured to define knee airbag canisters.

A structural duct 212 is located between the instrument panel substrate 120 and the reinforcement 150. When bonded to the reinforcement 150 and the substrate 120, the structural duct 212 forms a hollow tube which both conveys air through the instrument panel 26 and provides the instrument panel with structural rigidity. The air travels though the structural duct 212 to a set of substrate vent openings 216 which direct the air to the side and central air vents 80, 84 of the instrument panel 26 (FIG. 1). Attached to the reinforcement 150 is a plenum bracket 220 which connects with a firewall (not shown) of the vehicle 14. The plenum bracket 220 prevents bending of the instrument panel 26 in a vehicle forward and rearward direction. The plenum bracket 220 can also provide additional support for the steering column 68 (FIG. 1), coupled to the substrate 120.

Referring now to FIG. 2, the instrument panel substrate 120 is formed from a hybrid composite material according to an embodiment of this disclosure. In one exemplary embodiment, the driver-side portion 184 can be formed from a nylon resin having chopped carbon fibers disposed in the resin. The passenger-side portion 188 can be formed from a nylon resin having chopped glass fibers disposed in the resin. In general, regions in the substrate 120 with higher percentages of chopped carbon fibers can have enhanced mechanical properties (e.g., toughness, tensile strength, fatigue resistance). The carbon fiber volume fraction and the glass fiber volume fraction in the passenger-side and driver-side portions 184, 188 may be between about 1% and about 60%, preferably between about 15% and about 40%, and more preferably between about 30% to about 40%. In some embodiments, the fiber volume fraction in the driver-side portion 184 may be different from the fiber volume fraction in the passenger-side portion 188 of the substrate 120. In additional embodiments, areas of the substrate 120 that are anticipated to encounter high stresses are configured to incorporate higher fiber volume fractions of chopped carbon fibers than areas not expected to experience high stresses. For example, the mounting area 196 may incorporate a higher fiber volume fraction, particularly of chopped carbon fibers, than the rest of the driver-side portion 184 of the substrate 120 to aid in supporting the steering column 68. In another example, the surfaces of the instrument panel substrate 120 and reinforcement 150 subject to high stress during airbag deployment may incorporate higher fiber volume fractions. In further embodiments, the driver-side and passenger-side portions 184, 188 of the substrate 120 may incorporate more than two composite materials.

In some embodiments, the fibers employed in the driver-side and passenger-side portions 184, 188 of the instrument panel substrate 120 can be composed of materials including carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. Driver-side and passenger-side portions 184, 188 may also incorporate more than one type of fiber. In some embodiments, the length of the chopped fibers can be between about 3 mm and about 11 mm, and more preferably between about 5 mm and about 7 mm. Typically, the fibers are randomly oriented in the resins within the driver-side and passenger-side portions 184, 188. However, the fibers may also be substantially aligned directionally in areas of the substrate 120 subject to high directional stresses. Further, the resins employed in the driver-side and passenger-side portions 184, 188 can comprise a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof. In some embodiments, the resin of the driver-side portion 184 may be different from the resin employed in the passenger-side portion 188 of the substrate 120. It should also be understood that the reinforcement 150 and its driver-side, center-stack and passenger-side portions 154, 158, 162 can be fabricated with hybrid composite materials comparable to those described above in connection with substrate 120 or be a single composite throughout. In another example, the driver-side portion 154 of the reinforcement 150 can be formed from a nylon resin having chopped carbon fibers disposed in the resin. The passenger-side portion 162 can be formed from a nylon resin having chopped glass fibers disposed in the resin. Further, the volume fraction of the fibers in the resins, preferably the chopped carbon fibers, may be greater in areas subject to higher stress levels than in the rest of the reinforcement 150.

Still referring to FIG. 2, the chopped carbon and glass fibers are segregated in the substrate 120 of the instrument panel 26 such that the carbon fibers are substantially concentrated in the driver-side portion 184 of the substrate 120 and the glass fibers are substantially concentrated in the passenger-side portion 188 of the substrate 120. In general, the center-stack portion 180 of the substrate 120 is composed of both chopped carbon and glass fibers. In some embodiments, the center-stack portion 180 may primarily include carbon fibers, or primarily glass fibers. In other embodiments, the carbon fibers primarily contained in the driver-side portion 184 may also partially occupy the passenger-side portion 188 of the substrate 120. In further embodiments, the carbon fibers primarily in the driver-side portion 184 may also occupy portions of the substrate 120 which are subject to high stress, regardless of passenger-side or driver-side orientation. For example, airbag deployment surfaces located in or on the substrate 120 or reinforcement 150 can include higher percentages of carbon fibers for additional mechanical reinforcement. The segregation of the fibers, e.g., chopped carbon and glass fibers, in the substrate 120 allows the higher strength fiber, e.g., carbon fiber, to be selectively used where there are particular high strength needs for the substrate 120, such as to support the steering column 68. The selective use of high percentages of carbon fibers based on driver/passenger orientation relative to the vehicle 14 allows a cost savings by efficiently using the more expensive carbon fibers only where needed.

A boundary region 240 can exist in some embodiments at the interface between the driver-side and passenger-side portions 184, 188 of the instrument panel substrate 120. The boundary region 240 includes a mixture of both types of fibers and resin(s) employed in the driver-side and passenger-side portions 184, 188 of the substrate 120. The mixing of fibers within the boundary region 240 ensures that an integral connection exists between portions of the substrate 120 composed of different composite materials. In one embodiment, the boundary region 240 may span or otherwise encompass the entire center-stack portion 180 of the substrate 120. In another embodiment, the boundary region 240 may be present only between the center-stack and passenger-side portions 180, 188, or between the driver-side and center-stack portions 184, 180 of the substrate 120. The boundary region 240 can also be located anywhere in the substrate 120 where there is an interface between portions of the substrate 120 containing differing fiber fractions, fiber types and/or resins. In one exemplary embodiment, driver-side portion 184 may have an approximate 30% to 40% volume fraction of chopped carbon fibers in a resin, the passenger-side portion 188 may have an approximate 30% to 40% volume fraction of chopped glass fibers in the resin, and the center-stack portion 180 or the boundary region 240 may have an approximate 15% to 20% volume fraction of chopped carbon fibers and an approximate 15% to 20% volume fraction of chopped glass fibers in the resin. In this configuration, the driver-side portion 184 is particularly reinforced with higher percentages of chopped carbon fibers relative to other portions of the substrate 120.

Referring now to the depicted embodiments of FIGS. 2A-E, the driver-side portion of the substrate 120 is depicted as having a first plurality of chopped carbon fibers 186 disposed in a first nylon resin 185. The passenger-side portion 188 of the substrate 120 is depicted as having a first plurality of glass fibers 190 disposed in a second nylon resin 189. As explained above, the boundary region 240 within the substrate 120 includes a mixture of the first plurality of chopped carbon fibers 186, the first plurality of chopped glass fibers 190, the first nylon resin 185, and the second nylon resin 189. The reinforcement 150 includes a second plurality of chopped carbon fibers 193 disposed in a third nylon resin 194. The duct 212 includes a second plurality of chopped glass fibers 195 disposed in a fourth nylon resin 197.

According to some embodiments, the instrument panel substrate 120 and/or the reinforcement 150 of the instrument panel 26 may incorporate one or more preformed fiber mats in addition to the portions containing chopped fibers in a resin or resins. The preformed fiber mats may include woven or non-woven fibers that are held together using the same or different resins as employed in the driver-side and passenger-side portions 184, 188 of the substrate 120. The mats may also incorporate fibers having different dimensions from the fibers employed in the driver-side and passenger-side portions 184, 188 of the substrate 120. Similarly, the fibers of the mats may be in either a continuous or chopped configuration. The fibers of the mats may also be composed of a material having the same or a different composition from that of the fibers employed in the driver-side and passenger-side portions 184, 188 of the substrate 120. The mats may be incorporated in areas of the substrate 120 and/or the reinforcement 150 having high or low fiber volume fractions. Multiple mats may be used and layered in varying orientations in order to further enhance the mechanical properties of the substrate 120 and/or reinforcement 150 at particular locations. Exemplary locations in the substrate 120 for placement of the mat include, but are not limited to: the steering column mounting area 196, airbag assembly opening 208, glove box opening 204, coupling locations between the reinforcement 150 and the substrate 120, and other locations anticipated to experience higher stress levels compared to stresses in other areas of the substrate 120.

In some embodiments, components of the instrument panel 26 (e.g., the substrate 120, the reinforcement 150, the structural duct 212) may be expanded, foamed or made porous through an injection-expansion molding process as described in detail below. In such an embodiment, the resins used in the components may contain one or more expansion agents which cause the nucleation and formation of a multitude of gas bubbles after injection of the resins into a mold. In other embodiments, a mold where the resins and fibers will be injected is filled with a gaseous expansion agent that mixes with the resins. The expansion agents are used to form a plurality of bubbles within each of the components of the instrument panel 26. The bubbles formed from the one or more expansion agents may have a distribution in average size, or may be substantially uniform. The bubbles may form a closed cell structure, open cell structure, or a hybrid of closed and open which varies though the component. Additionally, expansion through the formation of air bubbles can be carried out on the entire component, or on only selective portions (e.g., driver-side portion, passenger-side portion, or center-stack portions) of the instrument panel 26 components. Additionally or alternatively, a gradient in the percentage of expansion or porousness of the substrate 120 or the reinforcement 150 may be controlled.

Expansion of the components of the instrument panel 26 (e.g., the substrate 120, the reinforcement 150, the duct 212) can increase dimensions of the part between about 10% and about 300%, and more particularly about 50% to about 100%. Expansion in the size of the components increases the structural rigidity of the components by creating a larger and/or thicker component. By increasing the size of the component that is subject to bending, a corresponding increase in the stiffness is gained. The use of expanded components allows for cost and weight savings to be had through a decrease in the amount of material used while maintaining a high level of structural rigidity. Additionally, the increased stiffness created by the thicker components, due to the expansion, may allow for less fiber to be used and a cost savings to be achieved.

The utilization of a hybrid composite containing carbon fibers in the substrate 120 and the reinforcement 150 permits the vehicle 14 to be designed and manufactured without a cross-car beam. Conventional cross-car beams are thick metal components traditionally used to support the instrument panel 26 and the steering column 68 of the vehicle 14. In addition to adding significant weight to the vehicle 14, the cross-car beam occupies a potential storage space behind the instrument panel 26 and obstructs placement of the passenger airbag assembly and the glove box assembly 110. Without the cross-car beam, the vehicle 14 can achieve greater fuel efficiency as well as enhanced design freedom for the instrument panel 26 and its subassemblies.

Additionally, the use of injection-expansion molding to form expanded structural components (e.g., substrate 120, reinforcement 150, and structural duct 212) permits cost and weight savings in portions of a vehicle not yet utilizing injection-expansion molding. Injection-expansion molding is typically used to form trim components and fascia for internal portions of vehicles which are not subject to structural loading. The gas bubbles, or porosity, in a part formed via injection-expansion typically precludes use of the part in any structural manner due to a decrease in strength from the gas bubbles. However, by utilizing injection-expansion molding in the formation of a hybrid composite component, that component may be used as a structural member of the vehicle while still taking advantage of the decrease in cost and weight offered by injection-expansion molding.

Figure 3:
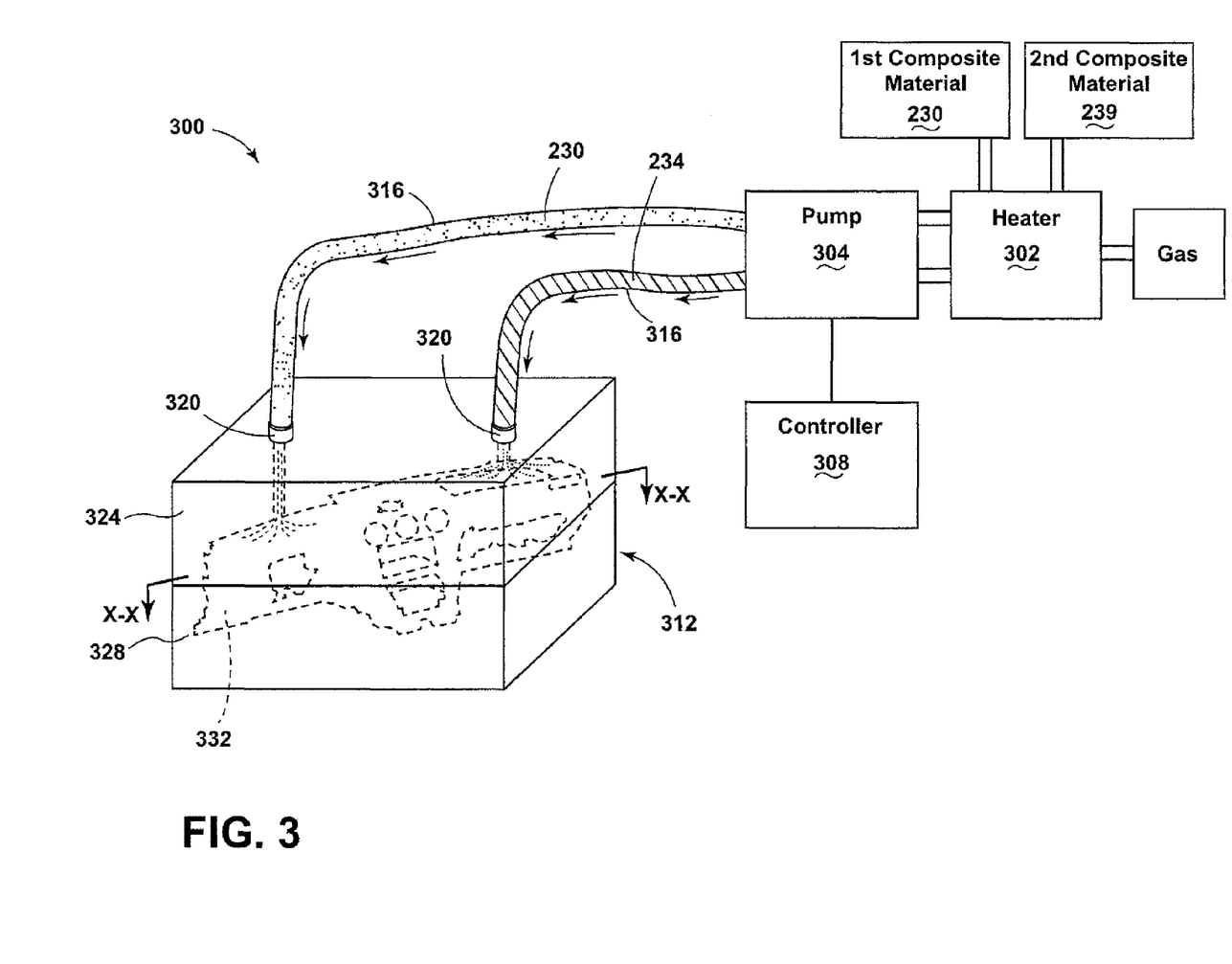
FIG. 3 is a top perspective view of an injection molding system according to an additional embodiment.

Referring now to FIG. 3, a schematic representation of an injection molding system 300 is depicted that includes a heater 302, a pump 304, a controller 308, a mold 312, and a pair of injection lines 316 according to one embodiment. The heater 302 melts a first composite 230 and a second composite 234 and the pump 304 pressurizes and forces the melted first and second composites 230, 234 through the injection lines 316, and into the mold 312 via connection ports 320. The pump 304 is capable of producing high fluid pressures which permit the first and second composites 230, 234 to be injected into the mold 312 at high pressures and speeds. Each injection line 316 engages one of the connection ports 320 on the mold 312 such that the first and second composites 230, 234 can enter the mold 312 at different locations. In some embodiments of system 300, more than two composite materials can be injected into the mold 312. In these configurations, the injection molding system 300 can include separate injection lines 316 for each material and the mold 312 may contain separate connection ports 320 for each additional injection line 316. In embodiments utilizing injection-expansion molding, the system 300 may include a gas system (not shown) for mixing and dissolving a gaseous expansion agent into the first and second composites 230, 234.

When solidified, the first and second composite materials 230, 234 of FIG. 3 are suitable for formation of a final component, e.g., the instrument panel substrate 120, reinforcement 150, structural duct 212. The first composite 230 includes the first fiber material within the first resin. Similarly, the second composite 234 includes the second fiber material within the second resin. Accordingly, the first and second fiber materials and the first and second resins may be composed of any of the respective fibers and resins disclosed in conjunction with the instrument panel substrate 120, the reinforcement 150, or the structural duct 212.

Again referring to FIG. 3, the mold 312 has an A-plate 324 and a B-plate 328, each plate defining approximately half of a cavity 332 of the mold 312. The A-plate 324 includes the connection ports 320 through which the first and second composite materials 230, 234 enter the mold 312. The A- and B-plates 324, 328 each contain an impression of about one half of the final vehicular component (e.g., structural duct 212, substrate 120, reinforcement 150, etc.) such that when the mold 312 is closed, the negative impressions define the mold cavity 332 with the approximate dimensions of the final component. In some embodiments, the mold 312 may include inserts and/or subassemblies to aid in formation of the final component. In embodiments utilizing injection-expansion molding, the mold 312 is designed such that the A-plate 324 and the B-plate 328 may be separated while the cavity 332 remains pressurized.

Figure 4A:
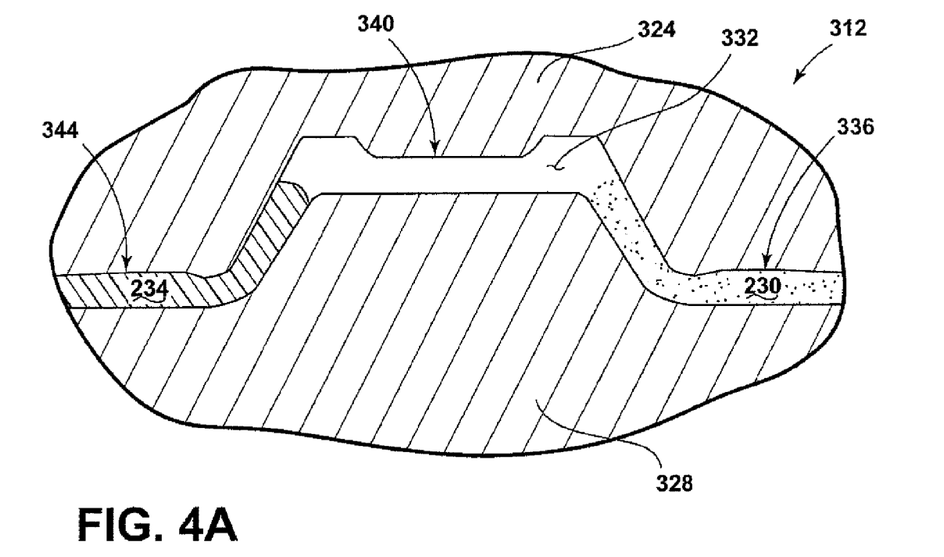
FIG. 4A is a cross-sectional view of the injection molding system of FIG. 3 during a step of injecting molten composites into a mold, taken at line X-X.

As shown in FIG. 4A, the mold 312, when configured to form a substrate 120, has a driver-side portion 336, a center-stack portion 340, and a passenger-side portion 344 oriented to form the respective portions 184, 180, 188 of the substrate 120 (FIG. 2). During injection of the melted first and second composites 230, 234, a clamping pressure is exerted on the mold 312 such that the A-plate 324 and the B-plate 328 are forced together. The force acting on the mold 312 prevents mold separation and flashing from occurring on the substrate 120. The mold 312, while depicted in a closed state in FIG. 5A, may be opened by separating the A-plate 324 and the B-plate 328. While the mold 312 is in an open state, the substrate 120 may be ejected, and the mold 312 and cavity 332 can then be cleaned. The injection molding system 300 employing mold 312 may also be used in a like manner as described above to form the reinforcement 150, the plenum bracket 220, the duct 212, or a variety of other vehicle components suitable for being fabricated with hybrid composites.

Figure 6:
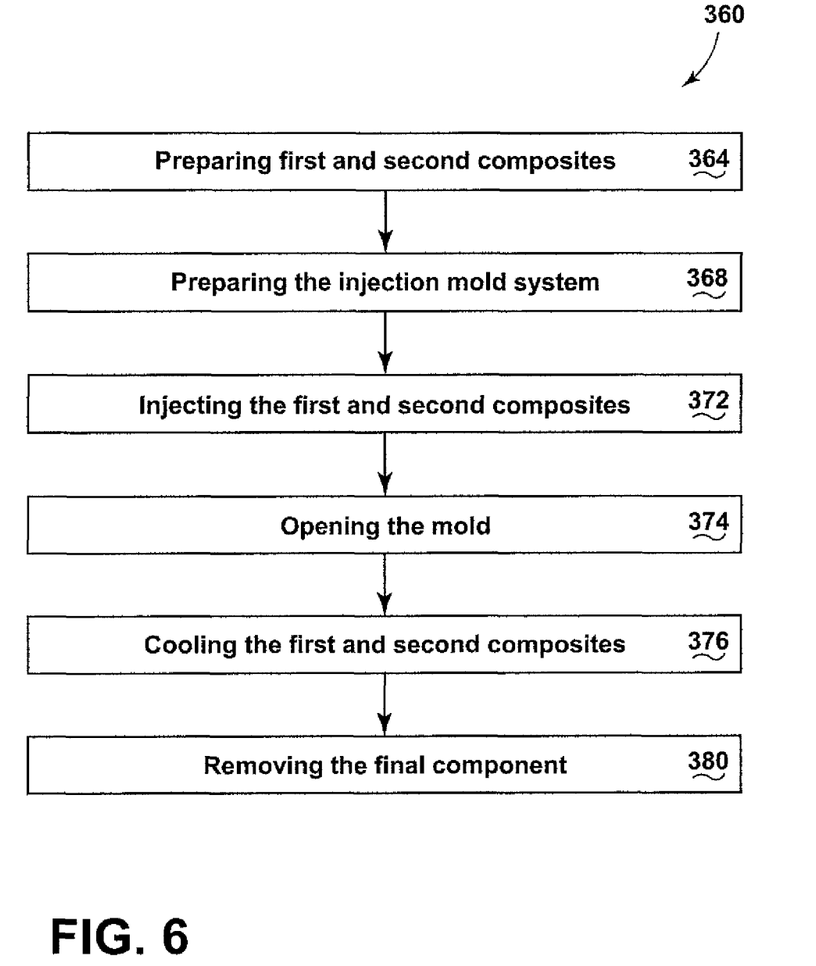
FIG. 6 is a schematic of a method for forming a vehicular component using the injection molding system of FIG. 4 according to another embodiment.

Referring now to FIG. 6, a schematic of a method 360 configured for formation of an final component, such as the substrate 120 of the instrument panel 26, is provided. The method 360 includes six primary steps, labeled steps 364, 368, 372, 374, 376, and 380. The method 360 begins with step 364 of preparing the first and second composites 230, 234, followed by step 368 of preparing the injection molding system 300. Next, the step 372 of injecting the first and second melted composite materials 230, 234 into the cavity 332 of the mold 312 is performed. Step 374 of opening the mold and expanding the composites 230, 234 is performed. The step 376 of cooling the melted first and second composites 230, 234 to form the final component, e.g., substrate 120 of the instrument panel 26, is conducted next. Finally, the step 380 of removing the final component from the mold 312 is performed.

Referring to FIGS. 4A-6, step 364 involves heating the first and second composites 230, 234 in the heater 302 to a temperature sufficient to melt the resin constituents. With the resins melted, the pump 304 is able to push the melted first and second composites 230, 234 through the injection lines 316 and into the cavity 332 of the mold 312 via the connection ports 320. The first and second composites 230, 234, particularly when comprising nylon resin, can be injected at a temperature between 100° C. and 400° C., and more preferably between 210° C. and 275° C. The melted first and second composites 230, 234 typically are superheated to a sufficiently high temperature to prevent their premature solidification in the injection lines 316 before reaching the cavity 332. As used herein, the term "superheat" refers to the temperature difference between the melting temperature and the injection temperature of the first and second composites 230, 234. The superheat is also necessary to ensure that the first and second composites 230, 234 have sufficiently low viscosity to enter narrow areas of the cavity 332. The superheat may be between 10° C. and 50° C. for composites 230, 234. Other injection temperatures and superheat conditions may be appropriate depending on the compositions selected for the composites 230, 234, geometry of the mold 312, and other conditions.

In embodiments of the method 360 utilizing injection-expansion molding, step 364 may also incorporate preparation of the first and second composites 230, 234 by introduction of the expansion agents. Expansion agents may be introduced to the first and second composites 230, 234 in a variety of manners. In one embodiment, the solid first and second composites 230, 234 may be provided with chemical based expansion agents already mixed therein. Exemplary chemical agents that may be utilized include hydrazine, sodium bicarbonate, and nitrogen-based materials. In other embodiments, the system 300 may include a gas system configured to mix a liquefied gas under pressure into the melted first and second composites 230, 234 to function as the expansion agent. The gas may be mixed into the first and second composites 230, 234 downstream of the heater 302 such that the gas may be dissolved into the melted composites 230, 234. Exemplary gases for the expansion agent may include nitrogen, carbon dioxide and other gases which are not reactive with the first and second compositions 230, 234.

Step 368 of preparing the injection molding system 300 may include tasks such as preheating the mold 312, priming the injection lines 316, priming gas systems, and/or placing a preassembled fiber mat or multiple mats into the cavity 332 of the mold 312. Step 372 of injecting the first and second composites 230, 234 may have a duration of between 5 seconds and 30 seconds, and more preferably between 10 seconds and 20 seconds. Other durations may be appropriate for more complex mold cavity 332 geometries and/or lower melt viscosity compositions for the composites 230, 234. In some embodiments, the injection of the melted first and second composites 230, 234 may be simultaneous, while in other embodiments, each composite is injected separately. During the injection step 372, the melted first and second composites 230, 234 are injected into respective driver-side and passenger-side portions 336, 344 of the mold 312 (see FIG. 5A), thereby causing substantial segregation of the fibers in the final component, e.g., substrate 120. The composites 230, 234 may also be injected at other points in the cavity 332 to create the desired segregation or other properties. In some embodiments, a gas may be injected into the mold 312 in advance of the first and second composites 230, 234 for use as an expansion agent.

With particular reference to FIG. 4A, a cross section of the mold 312 configured to produce the substrate 120 is depicted during the step 372 of injecting the first and second composite materials 230, 234 into the cavity 332 of the mold 312. The first and second composites 230, 234 are injected through a series of gates (not shown). The cavity 332 may be filled by injection of the first and second composites 230, 234 into respective driver-side and passenger-side portions 336, 344 of the cavity 332. Upon entering the mold 312, the melted first and second composites 230, 234 fluidly flow through the cavity 332 toward each other. One or more vents may be incorporated into the mold 312 proximate the center-stack portion 340 or other areas where the first and second composites 230, 234 meet, such that air can be expelled from the mold 312.

Figure 4B:
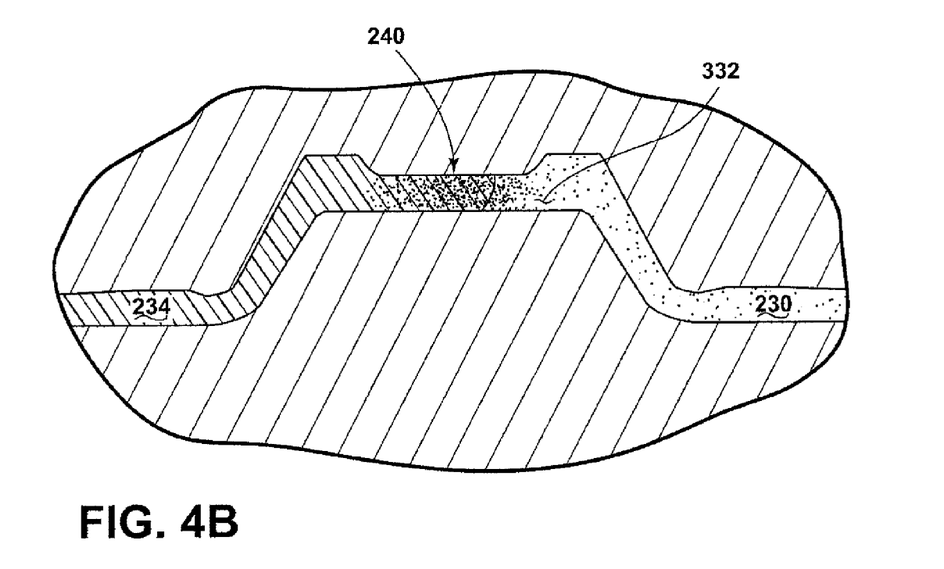
FIG. 4B is a cross-sectional view of the injection molding system of FIG. 3 during a step of mixing the melted composites, taken at line X-X.

Referring now to FIG. 4B, at a predetermined location in the cavity 332, the melted first and second composites 230, 234 continue to flow toward each other to combine to form the boundary region 240. The boundary region 240 includes a mixture of fibers and resins from the first and second composites 230, 234 and may have a width between 1 mm and 50 mm. The location and width of the boundary region 240 is controlled through design of the mold 312, processing parameters of the injection molding system 300 and the particular composition selected for the first and second composites 230, 234. The processing parameters may be controlled by the controller 308 (FIG. 4). In one exemplary embodiment, more than two composite materials having different compositions may be injected into the cavity 332 during the injection step 372. In this configuration, there can be a boundary region 240 between each of the composite materials such that each boundary region 240 has a different composition from the other boundary regions. Upon cooling and solidification of the first and second composites 230, 234, the mixture of the resins and fibers within the boundary region 240 creates an integral connection between the first composite material 230 and the second composite material 234, thereby holding the substrate 120 or other final component together.

Figure 5A:
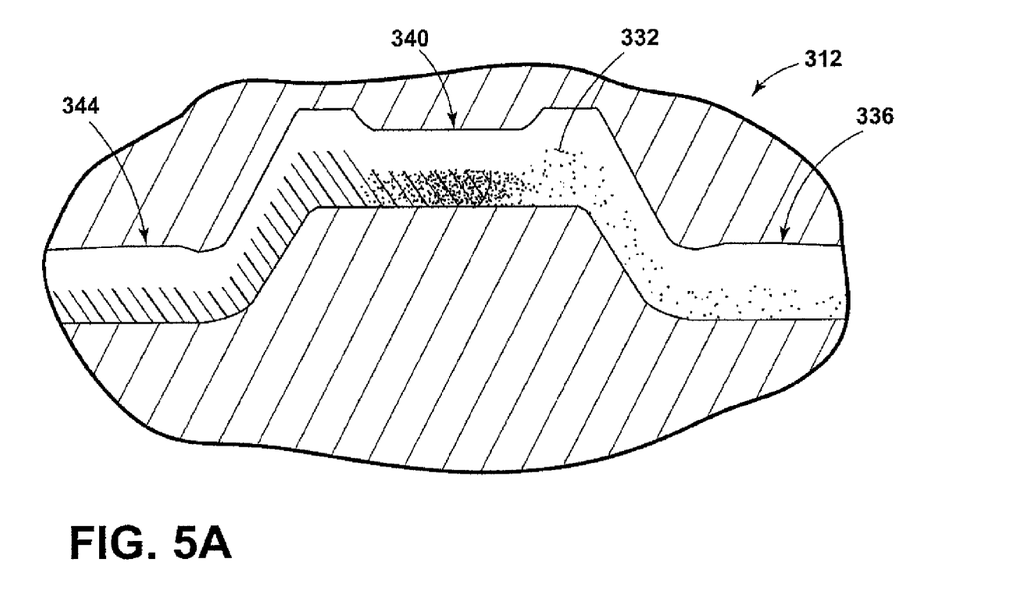
FIG. 5A is a cross-sectional view of the injection molding system of FIG. 3 during a step of opening the mold, taken at line X-X.
Figure 5B:
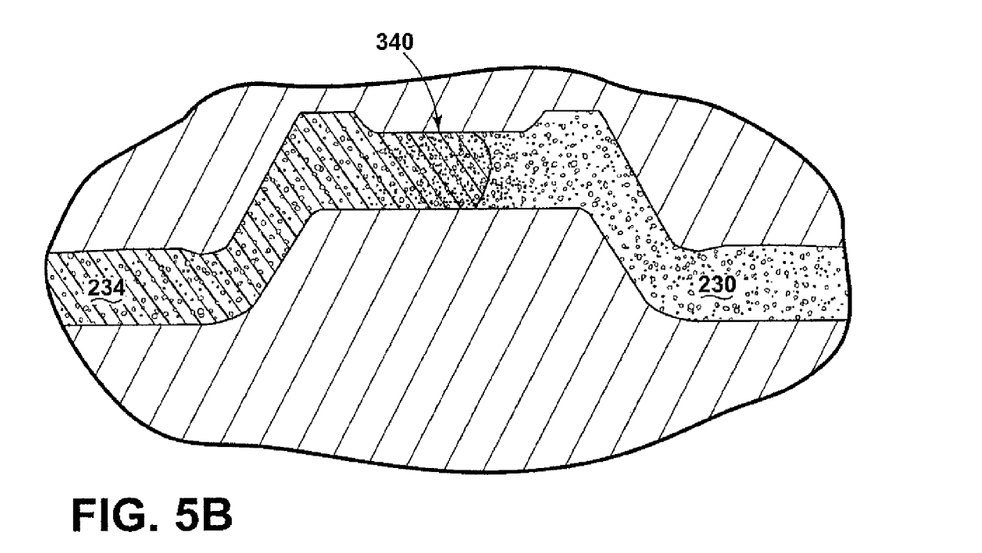
FIG. 5B is a cross-sectional view of the injection molding system of FIG. 3 during a step of expanding the melted composites, taken at line X-X.

Referring specifically to FIGS. 5A and 5B, step 374 of opening the mold 312 is done by separating the A-plate 324 from the B-plate 328 by a predetermined distance in order to expand the cavity 332 to the final desired dimensions of the instrument panel 26 components. Typical opening distances range from about 0.1 mm to about 10.0 mm, and more particularly between about 1.0 mm to about 4.0 mm. As the mold 312 is opened, the expansion agents present in the first and second composites 230, 234 rapidly generate air bubbles due to the change in pressure exerted on the mold 312 and the change in volume of the cavity 332. As the gas bubbles are generated within the resins of the first and second composites 230, 234, the volume of the instrument panel 26 component (e.g., substrate 120, reinforcement 150, structural duct 212) being formed increases and results in a corresponding increase in the component dimensions. The expansion agents are present in sufficient quantities to cause the first and second composites 230, 234 to expand and fill the enlarged cavity 332. It should be noted that in other embodiments the clamping pressure may be released from the mold 312 allowing the A-plate 324 and B-plate 328 to be separated by the expansion of the first and second composites 230, 234.

Referring again to FIGS. 4-6, step 376 of cooling the melted first and second composites 230, 234 to form the final component, e.g., substrate 120, occurs while the mold 312 is chilled. The mold 312 may be water chilled or may be air chilled to promote solidification of the final component. After solidification of the substrate 120, the mold is opened and step 380 of removing the final component is carried out by actuating a series of ejection pins (not shown) to eject the final component from the B-plate 328 of the mold 312.

It is to be understood that variations and modifications can be made on the aforementioned structure without departing from the concepts of the present invention. For example, the present disclosure of a hybrid composite and its method of manufacture could be equally applied to the grille of a motor vehicle. Attachment points in a hybrid composite grille, for example, may require added reinforcement in the form of chopped carbon fibers. Further, it is to be understood that such concepts are intended to be covered by the following claims unless these claims by their language expressly state otherwise.

What is claimed is:

1. A vehicular instrument panel, comprising:
   a substrate comprising a first plurality of chopped carbon fibers and a first plurality of chopped glass fibers within a first nylon resin;
   an expanded reinforcement coupled to the substrate comprising a second plurality of chopped carbon fibers within a second nylon resin,
   wherein the first plurality of chopped carbon fibers and the first plurality of glass fibers in the substrate are segregated such that the carbon fibers and the glass fibers are each substantially concentrated within respective driver-side and passenger-side portions of the substrate; and
   an expanded structural duct comprising a second plurality of chopped glass fibers within a third nylon resin, wherein the duct, reinforcement and substrate are coupled to form a hollow tube.

2. The vehicular instrument panel of claim 1, wherein the first plurality of chopped carbon fibers in the substrate has a fiber volume fraction in the nylon resin of about 15% to about 40%.

3. The vehicular instrument panel of claim 1, wherein a first and a second plurality of gas bubbles are disposed within the expanded reinforcement and the expanded structural duct, respectively.

4. The vehicular instrument panel of claim 1, wherein the first plurality of chopped carbon fibers in the substrate have an average fiber length of about 5 mm to about 7 mm.

5. The vehicular instrument panel of claim 1, wherein the substrate further comprises a boundary region, and further wherein the first plurality of chopped carbon fibers and the first plurality of glass fibers in the substrate are substantially mixed in the boundary region.

6. The vehicular instrument panel of claim 5, wherein the first plurality of chopped carbon fibers in the driver-side portion of the substrate has a fiber volume fraction of about 30% to 40% in the first nylon resin, the first plurality of chopped glass fibers in the passenger-side portion has a fiber volume fraction of about 30% to 40% in the first nylon resin, and the first plurality of chopped carbon fibers and the first plurality of chopped glass fibers in the boundary region each have a fiber volume fraction of about 15% to 20% in the first nylon resin.

7. The vehicular instrument panel of claim 1, wherein the structural duct is positioned between the reinforcement and the substrate.

8. The vehicular instrument panel of claim 7, wherein the hollow tube defined by the reinforcement and the duct is configured to distribute air through the instrument panel.

9. The vehicular instrument panel of claim 7, wherein the substantially hollow tube extends the length of the instrument panel.

10. The vehicular instrument panel of claim 7, wherein the first nylon resin of the substrate is expanded.

11. A vehicular instrument panel, comprising:
a first expanded member comprising a first fiber composite material;
a second expanded member comprising a second fiber composite material; and
a substrate coupled to the expanded members comprising a first fiber material and a second fiber material within a resin, the first and second fiber materials segregated into respective driver-side and passenger-side portions of the substrate, wherein the first and second expanded members are coupled to support the substrate.

12. The vehicular instrument panel of claim 11, wherein the first and second expanded members each contain a plurality of gas bubbles disposed throughout.

13. The vehicular instrument panel of claim 11, wherein the first and second fiber materials are each selected from the group of materials consisting of carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses.

14. The vehicular instrument panel of claim 11, wherein the resin is selected from the group of materials consisting of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

15. A method of forming a vehicular component, comprising the steps:
melting a first composite comprising a first fiber material, a first resin, and a first expansion agent;
melting a second composite comprising a second fiber material, a second resin, and a second expansion agent;
injecting the melted composites into a mold such that the first and second composites are each substantially concentrated into respective first and second portions of the mold;
opening the mold and allowing the melted composites to expand; and
cooling the melted and expanded composites to form an instrument panel component.

16. The vehicular component of claim 15, wherein the first and second fiber materials are each selected from the group of materials consisting of carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses.

17. The vehicular component of claim 15, wherein the first and second resins are each selected from the group of materials consisting of a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole.

18. The vehicular component of claim 15, wherein the first and second portions each have a fiber volume fraction of the respective first and second fiber materials in the respective first and second resins of about 15% to about 40%.

19. The vehicular component of claim 18, wherein the first fiber material in the first portion has a fiber volume fraction of about 30% to 40% in the first resin, the second fiber material in the portion has a fiber volume fraction of about 30% to 40% in the second resin, and the first and second fiber materials in the boundary region each have a fiber volume fraction of about 15% to 20% in the mixture of the first and second resins.

20. The vehicular component of claim 15, wherein the first and second expansion agents are selected from the group comprising nitrogen, carbon dioxide, hydrazine, and sodium bicarbonate.

* * * * *